United States Patent
Kordass et al.

(10) Patent No.: US 8,340,466 B2
(45) Date of Patent: Dec. 25, 2012

(54) ARRANGEMENT FOR THE IMAGING OF SURFACE STRUCTURES OF THREE-DIMENSIONAL OBJECTS

(75) Inventors: Bernd Kordass, Neuenkirchen (DE); Christian Gärtner, Greifswald (DE)

(73) Assignee: Heraeus Kulzer GmbH, Hanau (DE)

( * ) Notice: Subject to any disclaimer, the term of this patent is extended or adjusted under 35 U.S.C. 154(b) by 1003 days.

(21) Appl. No.: 11/658,713

(22) PCT Filed: Jul. 31, 2005

(86) PCT No.: PCT/EP2005/008295
§ 371 (c)(1), (2), (4) Date: May 26, 2009

(87) PCT Pub. No.: WO2006/013074
PCT Pub. Date: Feb. 9, 2006

(65) Prior Publication Data
US 2009/0304302 A1 Dec. 10, 2009

(30) Foreign Application Priority Data
Jul. 30, 2004 (DE) .......................... 10 2004 037 464

(51) Int. Cl.
 *G06K 9/36* (2006.01)
(52) U.S. Cl. ........ 382/287; 345/419; 345/420; 345/582; 352/57; 382/154; 600/407
(58) Field of Classification Search .................. None
See application file for complete search history.

(56) References Cited

U.S. PATENT DOCUMENTS

| | | | | |
|---|---|---|---|---|
| 4,925,294 A | * | 5/1990 | Geshwind et al. | .............. 352/57 |
| 4,982,438 A | * | 1/1991 | Usami et al. | .................. 382/154 |
| 5,384,912 A | * | 1/1995 | Ogrinc et al. | ................. 345/501 |
| 5,823,778 A | * | 10/1998 | Schmitt et al. | ................ 433/214 |
| 6,347,152 B1 | | 2/2002 | Shinagawa | |

(Continued)

FOREIGN PATENT DOCUMENTS

| | | |
|---|---|---|
| DE | 197 09 050 | 1/1998 |
| DE | 198 19 992 | 11/1999 |
| DE | 198 38 238 | 3/2000 |
| JP | 2002-95011 | 3/2002 |

OTHER PUBLICATIONS

International Search Report.

(Continued)

*Primary Examiner* — Tsung-Yin Tsai
(74) *Attorney, Agent, or Firm* — Collard & Roe, P.C.

(57) ABSTRACT

The aim of the invention is the improvement of an arrangement for the imaging of surface structures of three-dimensional objects, comprising a device for the optical recording of the surface of at least a partial region of the three-dimensional object from different positions, such that the imaging of the object can be carried out with comparatively little complexity with high reproducible accuracy. According to the invention, the arrangement thus comprises a selection circuit (9), for the selection of a first image section (10) and a subsequent image module (11), in which at least one further image section (12) is digitally recorded. A comparator unit (16) serves to compare the digital patterns (13, 14) contained in the first (10) and the at least one further image section (12) and permits the generation of comparison information on the degree of matching of the digital patterns (13, 14), provided to an image processing unit (19), for determination of spatial parameters and for the aggregation of the image section (10, 12) of the object to give an overall image.

25 Claims, 5 Drawing Sheets

U.S. PATENT DOCUMENTS

Figure 3:
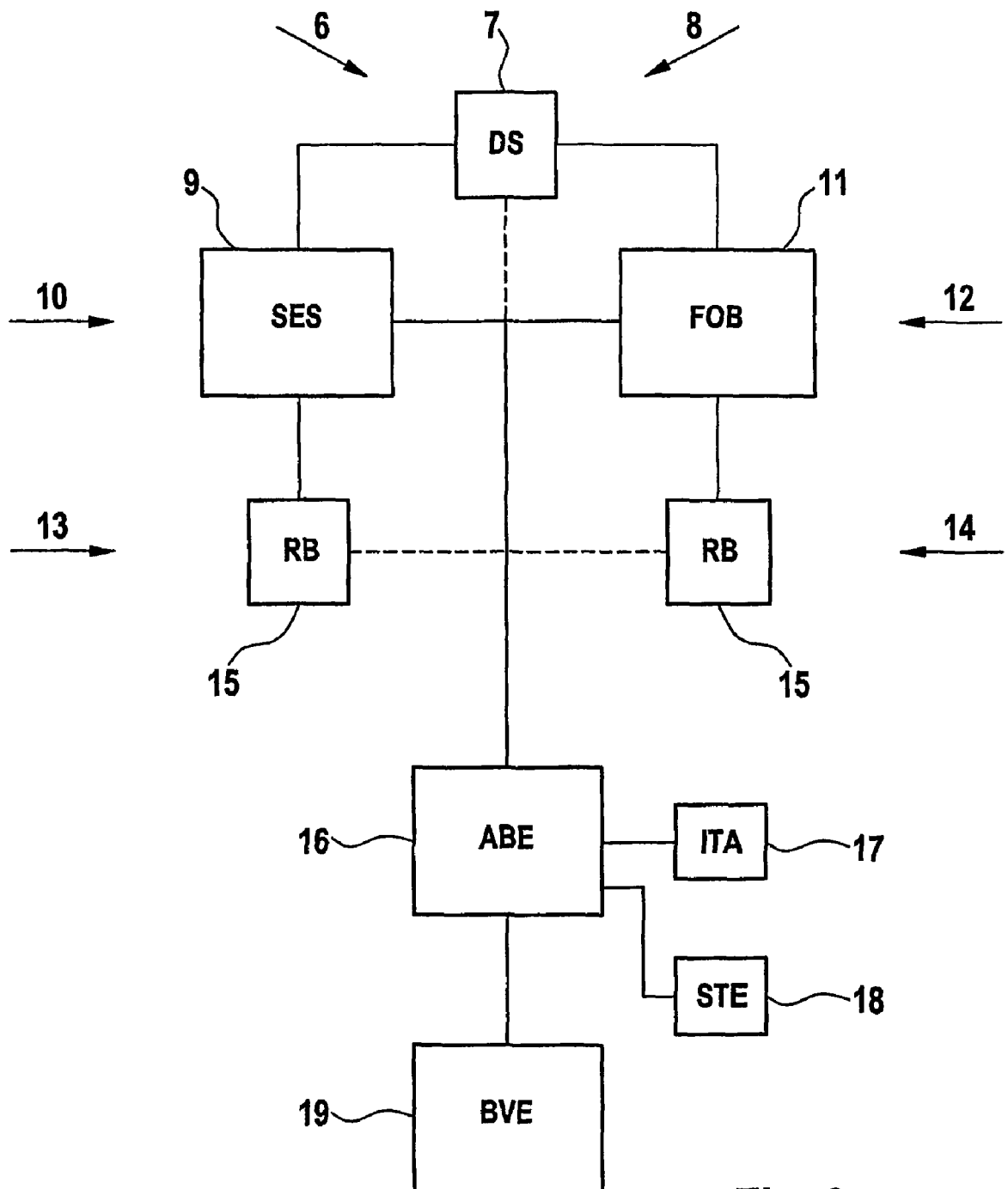

| | | | |
|---|---|---|---|
| 6,356,272 B1* | 3/2002 | Matsumoto et al. | 345/582 |
| 6,431,871 B1 | 8/2002 | Luthardt | |
| 6,466,205 B2* | 10/2002 | Simpson et al. | 345/419 |
| 6,744,441 B2* | 6/2004 | Wu et al. | 345/582 |
| 6,847,371 B2* | 1/2005 | Matsumoto et al. | 345/582 |
| 6,954,212 B2* | 10/2005 | Lyons et al. | 345/582 |
| 7,298,907 B2* | 11/2007 | Hasegawa | 382/209 |
| 2001/0005204 A1* | 6/2001 | Matsumoto et al. | 345/418 |
| 2003/0085891 A1* | 5/2003 | Lyons et al. | 345/420 |
| 2004/0019262 A1* | 1/2004 | Perelgut | 600/407 |
| 2005/0215879 A1* | 9/2005 | Chuanggui | 600/407 |
| 2006/0061583 A1* | 3/2006 | Spooner et al. | 345/582 |
| 2008/0069399 A1* | 3/2008 | Nagao et al. | 382/103 |
| 2008/0246836 A1* | 10/2008 | Lowe et al. | 348/46 |
| 2008/0259073 A1* | 10/2008 | Lowe et al. | 345/419 |

OTHER PUBLICATIONS

Ayoub et al., "A three-dimensional imaging system for archiving dental study casts: A preliminary report," The International Journal of Adult Orthodontics and Orthognathic Surgery, 1997, vol. 12, No. 1, pp. 79-84, XP009057562. (ISR).

Rekow, "Comparison of Three Data Acquisition Techniques for 3-D Tooth Surface Mapping," Engineering in Medicine and Biology Society, 1991, vol. 13: 1991, Proceedings of the Annual International Conference of the IEEE, pp. 334-335, XP010101545. (ISR).

Redert et al., "Correspondence estimation in image pairs" IEEE Signal Processing Magazine, IEEE Service Center, vol. 16, No. 3, May 1999, pp. 29-46, XP002155560. (ISR).

Lane et al., "Tutorial: Overview of Stereo Matching Research," Tina Memo No. 1994-001, Dec. 1998, pp. 1-10, XP002355354, Imaging Science and Biomedical Engineering Division, Medical School, University of Manchester. (ISR).

Paul et al., "Digital documentation of individual human jaw and tooth forms for applications in orthodontics, oral surgery and forensic medicine," Industrial Electronics Society, 1998, Proceedings of the 24th Annual Conference of the IEEE, vol. 4, pp. 2415-2418, XP010308356. (ISR).

* cited by examiner

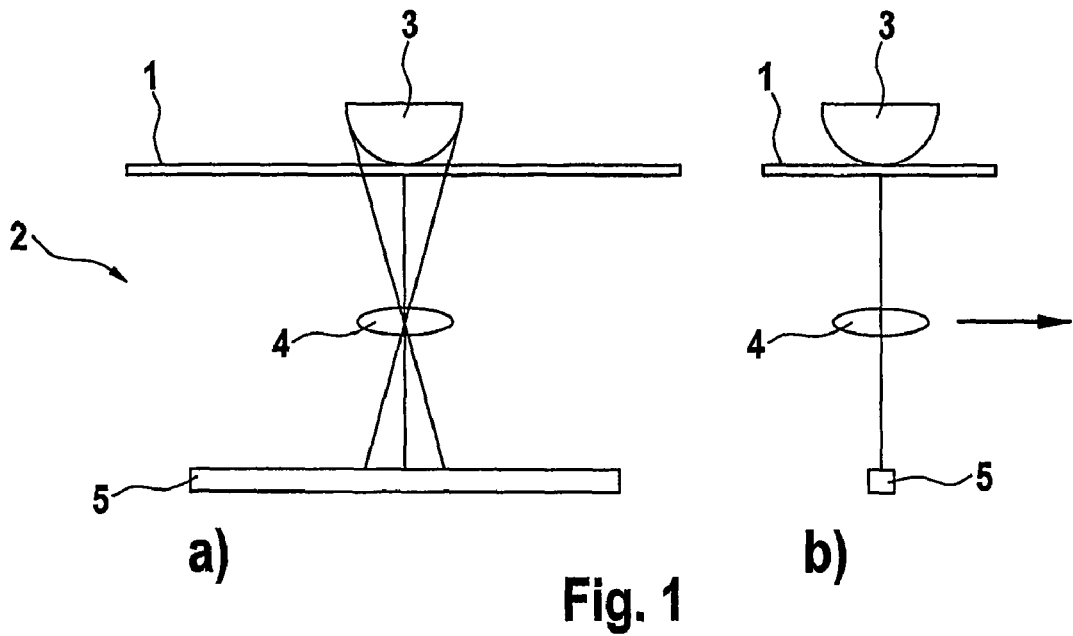
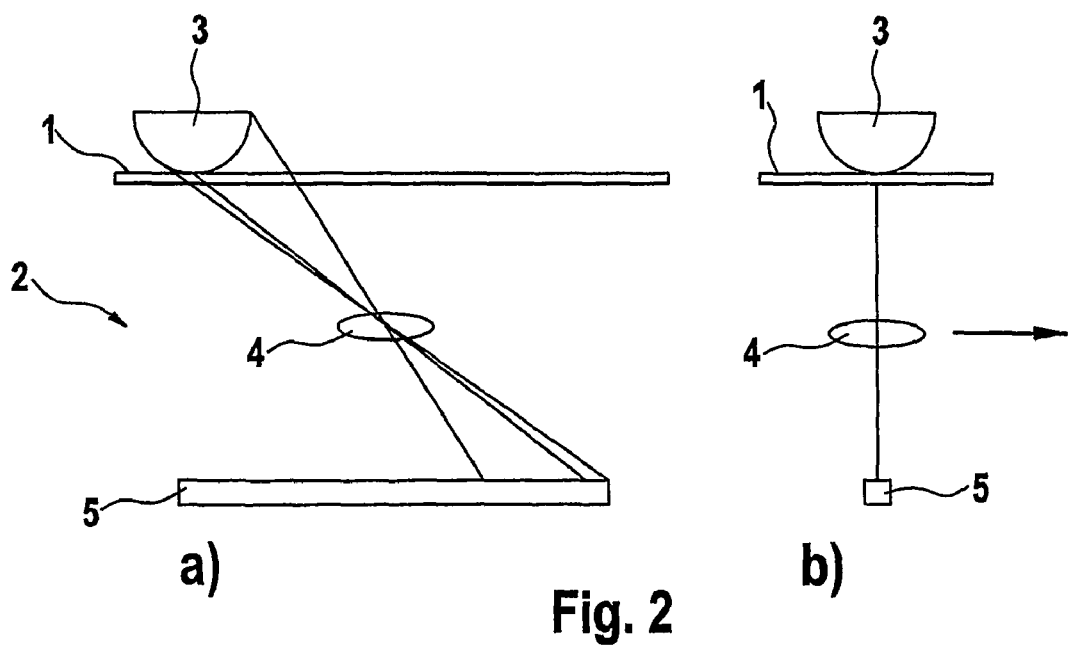

ARRANGEMENT FOR THE IMAGING OF SURFACE STRUCTURES OF THREE-DIMENSIONAL OBJECTS

CROSS REFERENCE TO RELATED APPLICATIONS

Applicants claim priority under 35 U.S.C. §119 of German Application No. 10 2004 037 464.3 filed Jul. 30, 2004. Applicants also claim priority under 35 U.S.C. §365 of PCT/EP2005/008295 filed Jul. 31, 2005. The international application under PCT article 21(2) was not published in English.

The invention relates to an arrangement for imaging surface structures of three-dimensional objects, in accordance with the preamble of claim 1, and an arrangement for imaging surface structures of three-dimensional, multi-part objects, in accordance with the preamble of claim 16.

In connection with the imaging of an object, there is frequently a desire to obtain not only data in one plane, but also perpendicular to the latter, in the form of height and depth data, and therefore to obtain spatial data with regard to at least one partial region of the object. This is particularly necessary every time when an impression about the structure and surface composition of the object in question, with reference to a specific observation situation, must be imparted to the observer. If it is not possible to make sufficient data about the application case in question available on the basis of such imaging of the object, there is fundamentally also the possibility of recording the object from different observation angles and utilizing the data thereby made available to produce a three-dimensional image of the object or of partial regions of it.

For recording of an object with precise details, which requires high resolution, it is known to use a flatbed scanner as the scanning unit for data to be recorded digitally.

Thus, an arrangement for recording spatial objects in a color image, using a flatbed scanner, is known from DE 197 09 050 A1; additional optics are used here. With these additional optics, an increase in the distance of the object is achieved, so that spatial objects can be disposed on a rotating object carrier, at a sufficient distance from the scanner. With the rotating object carrier, the object is digitally recorded in different views. A suitable software thereupon produces three-dimensional data sets of the object surface.

Such a solution is suitable for recording colored spatial objects, but a precise determination of the various angles of rotation at which the object has been optically recorded is not easily possible, so that combining the individual images to produce an overall image, with sufficient precision, is at least made difficult.

Furthermore, a device for producing three-dimensional recorded images of objects by means of an optical scanner, and a method for three-dimensional object recording, are described in DE 198 19 992 A1. In the case of such a method, the object is recorded in two or more picture-taking modes, consecutively in terms of time and/or simultaneously, after which the recorded data are stored in memory and processed by computer to produce a spatial model.

The implementation of such a solution is complicated, because of the need for a precise determination of the relative position of the object with regard to the optical scanning device, particularly if the object in question must be recorded by the scanning device in different positions, with time offset.

If an object furthermore consists of several partial objects, which are situated in a certain relative position with regard to one another, due to their function or use, the partial objects often cannot be recorded completely, or only with significant effort and comparatively low imaging precision.

The invention is based on the task of achieving imaging of an object with high, reproducible precision, with comparatively little effort.

According to the invention, this task is accomplished, in the case of an arrangement for imaging surface structures of three-dimensional objects, in accordance with the preamble of claim 1, in that the arrangement has a selection circuit for selecting a first image section, the optical data of which result from a first observation direction and are digitally recorded, and a subsequent image module, in which optical data of at least one further image section, proceeding from a changed observation direction, are digitally recorded, and that a matching unit is provided, in which matching of the digital patterns contained in the first and the at least one other image section takes place, with regard to characteristic digital patterns that essentially agree with one another, and in which matching data are generated, as a function of the agreement of the digital patterns, which data are available to the image processing unit for determining the spatially related parameters and for aggregating the image sections of the object to produce an overall image.

With the invention, the possibility is created of drawing a conclusion from a comparison of the digital patterns contained in the selected image sections with difference data, in the sense of a remaining non-agreement of digital patterns of at least two image sections, to produce a three-dimensional overall image. Recourse to parameters that record the absolute position of the object in space or the relative position of the scanning device and the object during scanning procedures is not required in this connection.

Such an arrangement will therefore be used, in particular, if the determination of the relative position of the scanning device and the object to be imaged can only take place with significant effort or cannot take place successfully in the given surroundings.

In a preferred embodiment of the invention, the selection circuit and/or subsequent image module have a reference component in which a change in the size and/or resolution of the image section takes place, to the effect that characteristic digital patterns that differ from one another are contained in the image section in question.

Preferably, an iteration algorithm for a clear determination of characteristic digital patterns in each one of the recorded image sections is provided in the matching unit.

In this connection, there is the practical possibility of activating the iteration algorithm whenever a reproducible digital pattern is present in the matching unit at least once, for each of the image sections that are part of the overall image.

Furthermore, it is advantageous that the iteration algorithm allows a change in the data content of a digital pattern of an image section and, in the end result of an iteration step, a check for clear verifiability of a corresponding change in a digital pattern in at least one further image section.

In another embodiment of the invention, a structure recording unit that serves to record a structure change gradient of a digital pattern is implemented in the matching unit. Using this structure recording unit, segments within a partial region that have a strong structure are recorded and passed to an evaluation unit.

If the objects to be imaged have only slight structuring, not easily accessible to evaluation, a supplemental structure having a position determined relative to the object surface can be superimposed on the former.

Such a possibility can be implemented, for example, in that an optical pattern is produced on the surface of the object to be imaged, by means of light projection, for example as the shadows cast by a line pattern of a film that is placed under the object and illuminated by the light source of the scanning device. In this case, evaluation of the projected shadow patterns can take place utilizing a suitable software.

Furthermore, it also lies within the scope of the invention that the material for the production of the object contains admixtures that are an integral part of the surface of the object, in the end result of the production process.

According to a technically advantageous embodiment of the invention, the arrangement has an object carrier made of glass or otherwise optically transparent material for the object to be imaged, whereby the object carrier can be an integral part of a flatbed scanner.

In another preferred embodiment of the invention, the arrangement has a positioning device for positioning the object relative to the object carrier, whereby the positioning device can preferably be controlled in such a manner that the object is situated in an orientation that is optimal for the scanning procedure, in the end result of the positioning.

If the object consists of at least two partial objects that are situated in a functionally related reference position relative to one another, a correlation device can be provided, in an embodiment of the invention, with which at least two partial objects are connected with one another in such a manner that at least one of the partial objects can be moved into an imaging position that differs from the reference position, in order to prepare for optical recording of the surface of the at least two partial objects. Optical recording of the partial objects and of the correlation device that connects the partial objects takes place in the imaging position. The reference position of the at least two partial objects is determined by means of calculations, from the data about the partial objects and about the correlation device obtained in the imaging position, as well as from knowledge of the verifiable change in position of the at least one partial object from the reference position into the imaging position connected with the correlation device.

The object to be imaged can be an object for dental medicine use, which carries a supplemental structure, if applicable, which facilitates the selection of a suitable digital pattern.

In connection with dental medicine use, there is the possibility of use of the arrangement according to the invention for recording, reproducing, documenting, archiving and/or analysis of jaw or tooth models, of jaw or tooth impressions, of bite registrations, of bite or jaw relation registrations, and/or of preparations of the teeth.

Another solution of the task of the invention consists of an arrangement for imaging surface structures of three-dimensional, multi-part objects in accordance with the preamble of claim 16.

According to the invention, this arrangement is characterized in that it has a correlation device, by way of which or with which the at least two partial objects are connected in a defined positional relationship that can be pre-selected, that the correlation device is configured for a change in the relative position of the partial objects relative to one another that is bound to the correlation device, that at least one of the partial objects, bound to the correlation device, can be moved from a functionally determined position into a different imaging position, suitable for optical recording together with at least one other partial object, in which optical recording of the partial objects and of the correlation device that connects the partial objects takes place, and that the arrangement has an allocation unit in which the data obtained in the imaging position and stored in the memory of the digitalization unit relating to the surface structure of the partial objects are linked with data recorded in a reference module concerning the change in position of at least one partial object from the reference position into the imaging position, so that the reference position of the partial objects relative to one another can be reconstructed by means of calculations, including the data concerning the surface structure of the partial objects.

The invention is connected with the advantage that partial objects that form an object, the surface structures of which are not accessible when integration into the object exists, or are only accessible with significant effort, can be optically recorded in an efficient scanning procedure, at the same time and at high resolution, without having to do without the data concerning their original relative position with regard to one another.

In order to be able to represent partial objects also in three dimensions, a partial object in the imaging position is recorded from different observation directions in a preferred embodiment of the invention. The data sets obtained in this manner are stored in the memory of the digitalization unit and processed in an image processing unit to produce a three-dimensional overall image.

The arrangement can have a selection circuit for selecting a first image section of a partial object, the optical data of which result from a first observation direction and are digitally recorded, and a subsequent image module in which optical data of at least one other image section of this partial object, proceeding from a changed observation direction, are digitally recorded. Also, a matching unit is provided, in which matching of the digital patterns contained in the first and in the at least one other image section takes place with regard to characteristic digital patterns that agree, to a great extent, and in which matching data are generated as a function of the degree of agreement of the digital patterns, which data are available to the image processing unit for determining the spatially related parameters and for aggregating the image sections to produce a three-dimensional overall image of the partial object.

In a practical embodiment of the invention, the correlation device is inserted into the partial objects that are situated in the reference position. In this connection, the correlation device can be configured as an axle about which the partial objects are disposed so as to pivot.

Furthermore, there is also the possibility to rigidly connect the correlation device and the partial objects, by way of connection regions, and to provide the correlation device with a base that can pivot and/or rotate, which base is preferably configured as a ball joint.

Preferably, a flatbed scanner or laser scanner is used as the device for optically recording the surface of at least two partial objects.

The object that consists of the partial objects to be imaged can be an object of a dental medicine use, in which the relative position of the upper jaw and the lower jaw relative to one another is recorded as the reference position.

The arrangement according to the invention is particularly suitable for recording, reproducing, documenting, archiving and/or analysis of jaw or tooth models, of jaw or tooth impressions, of bite registrations, of bite or jaw relation registrations, and/or of preparations of the teeth.

In the following, the invention will be described in greater detail using an exemplary embodiment, with related drawings.

Figure 4:
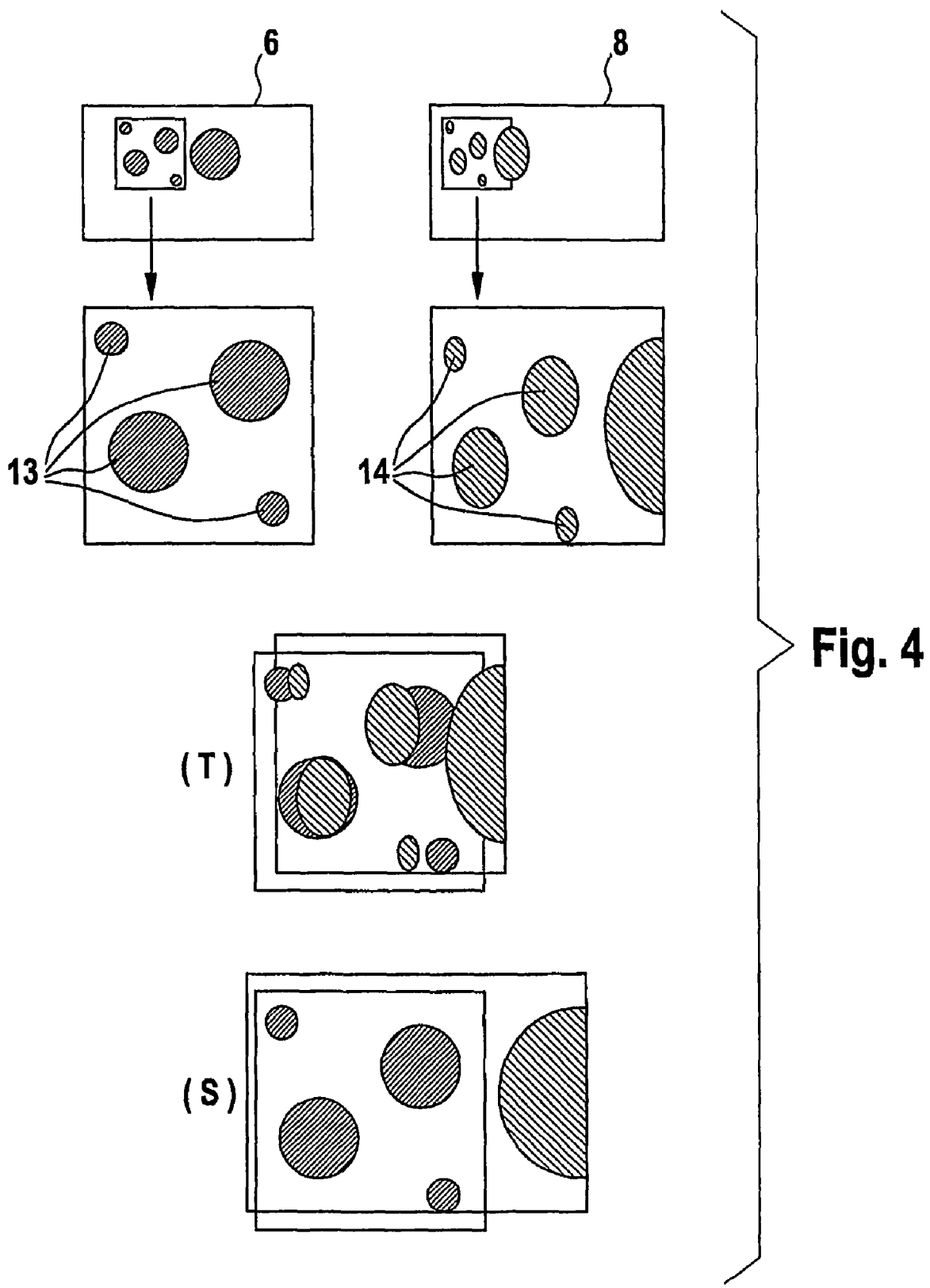
Figure 5:
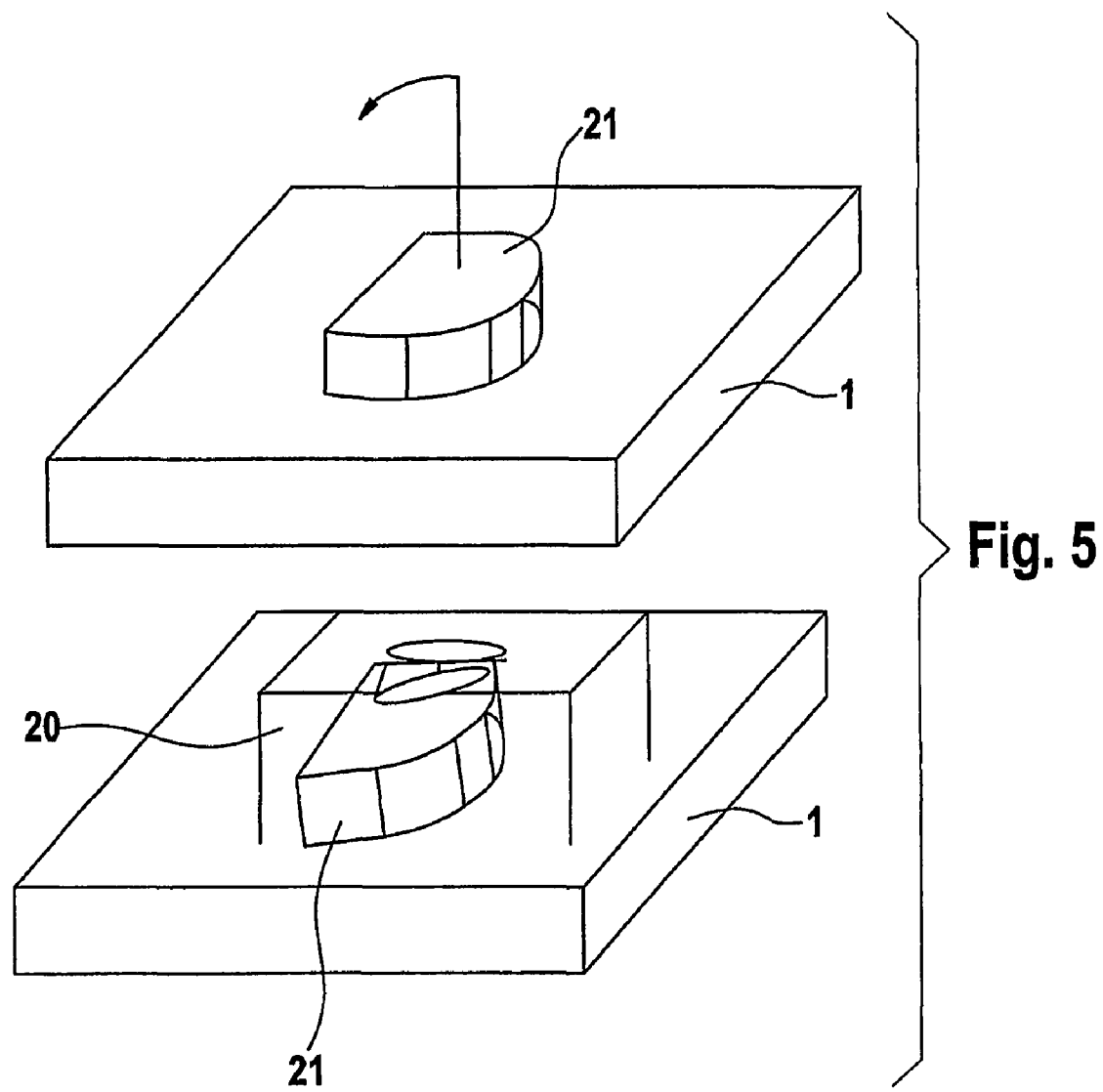
Figure 6:
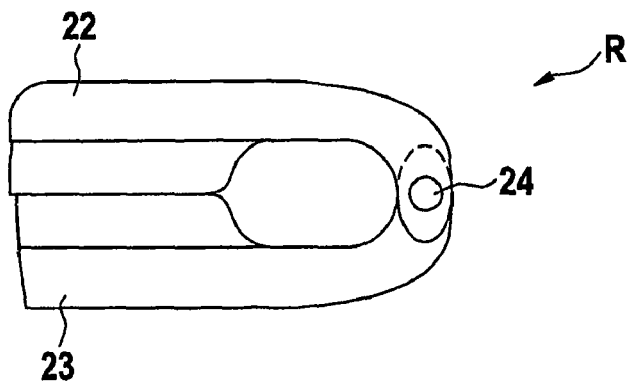
Figure 7:
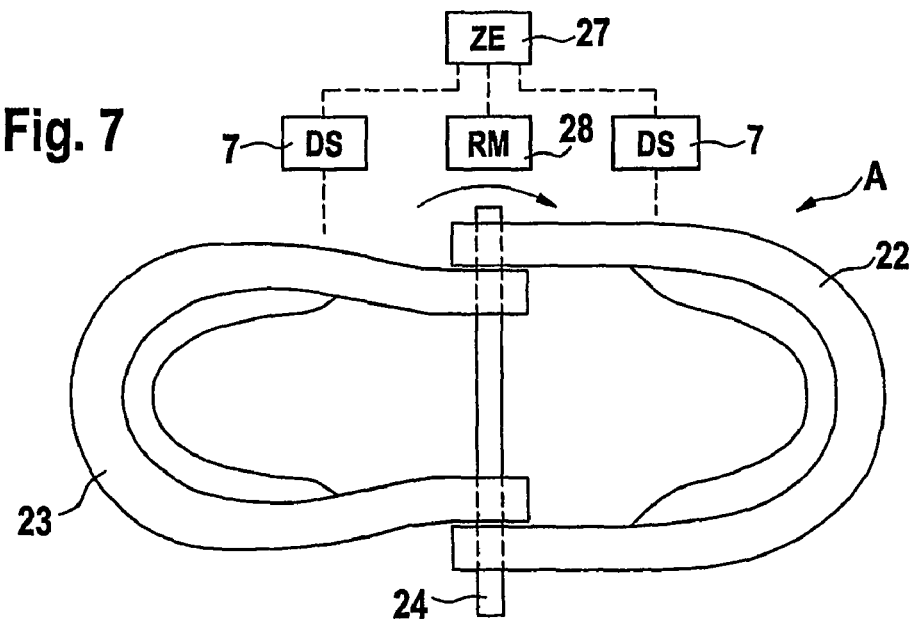
Figure 8:
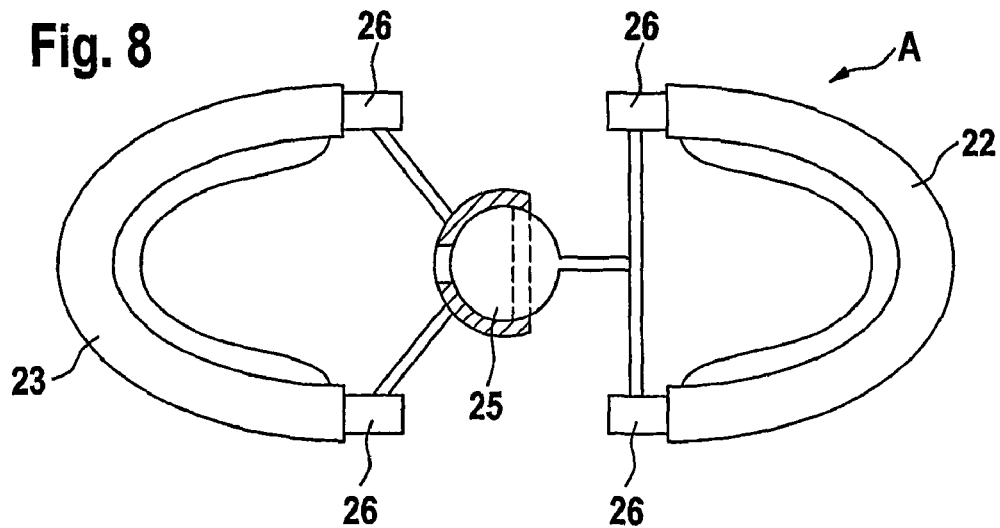

These show:

FIG. 1 a device for two-dimensional optical recording of a data set of a tooth model, FIG. 2 a device according to FIG. 1 for recording of another data set, with the tooth model offset laterally with reference to the scanning device, FIG. 3 a block schematic of the arrangement according to the invention, FIG. 4 a representation of the principle of the selection of interrelated image sections on the basis of characteristic digital patterns, FIG. 5 an object carrier of a scanning device with positioning device for a jaw model, FIG. 6 jaw models connected by means of a correlation device, in the reference position, FIG. 7 jaw models connected by means of a correlation device, in the imaging position, and FIG. 8 jaw models in the imaging position, with the correlation device changed as compared with FIGS. 6 and 7.

In order to carry out a scanning procedure, a tooth model 3 is situated on the holder glass 1 of a flatbed scanner 2, shown only schematically in FIG. 1, the surface of which model is digitally recorded during a movement, together with the holder glass 1, over optics 4 of a CCD line sensor 5 (FIG. 1a). In FIG. 1b, the scanning direction of the flatbed scanner 2 is recorded by means of the directional arrow, in a representation of the scanning device that has been rotated by 90 degrees relative to FIG. 1a, to better illustrate the scanning procedure.

On the basis of such digital recording of the surface of the tooth model 3, which takes place line by line, using a flatbed scanner 2 whose method of functioning is sufficiently known to a person skilled in the art and therefore does not require any further explanation, a first overall image data set 6 of the tooth model 3 is stored in the data memory 7, in digital form.

Within the framework of another scanning procedure, in which the tooth model 3 is disposed on the holder glass 1 with lateral offset, with reference to the representation in FIG. 1a, as shown in FIG. 2a, another overall image data set 8 is produced, which is stored in the data memory 7 or another suitable memory location, and is available, together with the overall image data set 6, for further evaluation of the data. The scanning device is illustrated for this scanning procedure, as well, in that a directional arrow is entered in FIG. 2b, in a representation rotated by 90 degrees as compared with FIG. 2a.

Since the overall image data sets 6 and 8 relate to different object positions of the tooth model 3, laterally offset with reference to the scanning direction, regions of the object that can be structurally distinguished are recorded differently in the overall image data sets 6 and 8, so that difference data can be made available in a comparison of the digital data relating to one region that can be structurally distinguished, from the type of deviation of the data from one another, which difference data, in the end result of targeted data processing, make it possible to obtain spatial data.

As an implementation of this principle, the selection of a first image section 10 from one of the overall image data sets 6 or 8 takes place by way of a selection circuit 9, as it is an integral part of the arrangement according to the invention shown in FIG. 3. Another image section 12 is determined in a subsequent image module 11 from the other of the overall image data sets 8 or 6, which relates to a changed position of the tooth model 3 on the flatbed scanner 2 during the scanning procedure. The digital patterns 13 and 14 that exist in the two image sections 10 and 12 experience a change in the size and/or resolution of the image section in a reference component 15, so that characteristic digital data that differ from one another, in the form of pixel clusters that can be distinguished, are contained in each of the image sections 10 and 12 in question.

In order to be able to check the pixel clusters situated in different image sections 10 and 12 with regard to their degree of agreement, a matching unit 16 is provided, which has an iteration algorithm 17 that leads to a clear determination of characteristic digital patterns 13 and 14 in each of the recorded image sections 10 and 12, in the end result of the iteration.

Furthermore, a structure recording unit 18 can be implemented in the matching unit 16, which serves to record a structure change gradient of a digital pattern, thereby facilitating the selection of pixel clusters that can be differentiated.

Processing of the overall image data sets 6 and 8 in an image processing unit 19 takes place according to the representation in FIG. 4. The overall image data sets 6 and 8 do not have the same coverage, because of the different relative position of tooth model 3 and flatbed scanner 2, in each instance, so that the digital patterns 13 and 14 extracted from the overall image data sets 6 and 8 as pixel clusters also do not agree and appear distorted relative to one another and offset by translation in the plane. In order to determine the type of distortion and the size of the translatory offset of the digital patterns 13 and 14, a comparison of the pixel clusters is carried out, preferably line by line and column by column. If such a comparison does not permit any reliable difference data due to insufficient non-homogeneity of the digital patterns 13 and 14, a change in the size and/or the resolution of the image sections 10 and 12 can take place to increase the precision, on a case by case basis. The digital patterns 13 and 14 are superimposed on one another in the matching unit 16, by means of translatory transformation, and, if necessary, also rotatory transformation (T), and subsequent scaling (S), in such a manner that the difference of the two pixel clusters reaches a minimum. For this purpose, it is advantageous to use the method of bit by bit subtraction. The difference data obtained in this manner flow into the image processing unit 19 as an input variable; a z coordinate is generated for the image sections 10 and 12, for the individual pixels in the x-y plane, in each instance, in this unit. Taking into consideration the correction and calibration factors adapted to the application case, a three-dimensional data set results from this in the image processing unit 19.

In this way, a spatial image of the tooth model 3 can be called up by way of the image processing unit 19, without having to have recourse to parameters that relate to the positioning of the tooth model 3 on the flatbed scanner 2.

In order to guarantee a sufficiently differentiated structure of the tooth model 3 as a prerequisite for difference data of the image sections 10 and 12 that can be evaluated, the surface of the tooth model 3 can have a supplemental structure such as one that can be produced by means of light projection at different intensity, for example.

Furthermore, there is the possibility of applying adhesive particles to the surface of the tooth model 3, which it is practical to implement by way of a spraying method, in which the spraying distance and the spraying pressure can preferably be adjusted as a function of the adhesive particle distribution.

Also, highly structured starting substances or those provided with pigments can be used for the production of the tooth model 3, which, in the end result of the production process, are an integral part of the surface of the tooth model 3.

Furthermore, laser radiation that acts on the surface of the model and changes it can be used to produce a suitable surface structure. Appropriate results can be achieved with light-sensitive coatings, such as photo varnish coatings, in the end result of the related development process.

The change in relative position of object and scanning device required for producing the overall image data sets 6 and 8 can be brought about by means of straight-line translations of the object, also superimposed, to a limited degree, by rotations, on the object carrier. It also lies within the scope of the invention to modify the object carrier in terms of its surface configuration, with regard to positioning of the object that is particularly suitable for the scanning procedure. Alternatively or in addition to this, there is also the possibility of using a positioning device 20, as recorded in FIG. 5 for positioning of a jaw model 21, in order to be able to bring the object into a use-oriented position at least for generating an overall image data set, preferably in the case of planar object carriers.

According to the representation in FIG. 6, the object consists of partial objects in the form of jaw models 22 and 23, which are situated in a functionally determined reference position R with regard to one another. The end regions of the jaw models 22 and 23, which are not functionally relevant, are connected so as to rotate without play, in the reference position R, by means of a correlation device configured as an axle 24. By means of rotating the jaw model 22 by an angle of preferably approximately 180°, an imaging position A that is suitable for optically recording the surface structure of the jaw models 22 and 23 is achieved, as shown in FIG. 7. The corresponding imaging position A can also be implemented with a correlation device that has been changed as compared with FIG. 7, which is configured as a ball joint 25 and is connected with the jaw models 22 and 23 by way of connection regions 26 (FIG. 8).

In the imaging positions A of the jaw models 22 and 23 shown (FIGS. 7 and 8), a scanning procedure takes place, as was already described within the framework of this exemplary embodiment, whereby the correlation device 24 or 25 is included in the scanning procedure.

In an allocation unit 27, the data obtained in the imaging position A and stored in the memory of the digitalization unit 7, relating to the surface structure of the jaw models 22 and 23, are linked with data about the change in position of the jaw model 22 from the reference position R to the imaging position A, recorded in a reference module 28.

On such a basis, the reference position R of the jaw models 22 and 23 with regard to one another can be reconstructed by means of calculations, including the data relating to the surface structure of the jaw models 22 and 23.

The arrangement according to the invention allows digitally recording objects of dental medicine, which can also be formed from functionally connected partial objects, in two or three dimensions, reproducibly, with great precision.

The invention claimed is:

1. Arrangement for imaging surface structures of three-dimensional objects, having a device for optically recording the surface of at least one partial region of the three-dimensional object from different positions, a digitalization unit that serves to store the optical data about the two-dimensional surface structure of the at least one partial region of the object in memory, and having an image processing unit in which a three-dimensional overall image is produced from two-dimensional image sections, wherein the arrangement has a selection circuit (9) for selecting a first image section (10), the optical data of which result from a first observation direction and are digitally recorded, and a subsequent image module (11), in which optical data of at least one further image section (12), proceeding from a changed observation direction, are digitally recorded, and that a matching unit (16) is provided, in which matching of the digital patterns (13, 14) contained in the first (10) and the at least one other image section (12) takes place, with regard to characteristic digital patterns that essentially agree with one another, and in which matching data are generated, as a function of the agreement of the digital patterns (13, 14), which data are available to the image processing unit (19) for determining the spatially related parameters and for aggregating the image sections (10, 12) of the object to produce an overall image,
wherein the object consists of at least two partial objects (22,23) that are situated in a functionally related reference position (R) relative to one another, and wherein a correlation device (24, 25) is provided, with which at least two partial objects (22, 23) are connected with one another in such a manner that at least one of the partial objects (22) can be moved into an imaging position (A) that differs from the reference position (R), in order to prepare for optical recording of the surface of the at least two partial objects (22, 23), in which optical recording of the partial objects (22, 23) and of the correlation device (24, 25) that connects the partial objects (22, 23) takes place, wherein the reference position (R) of the at least two partial objects (22, 23) is determined by means of calculations, from the data about the partial objects (22, 23) and about the correlation device (24, 25) obtained in the imaging position (A), as well as from knowledge of the verifiable change in position of the at least one partial object (22) from the reference position (R) into the imaging position (A) connected with the correlation device (24, 25).

2. Arrangement for imaging surface structures according to claim 1, wherein a selection circuit (9) and/or subsequent image module (11) have a reference component (15) in which a change in the size and/or resolution of the image section takes place, to the effect that characteristic digital patterns (13, 14) that differ from one another are contained in the image section (10, 12) in question.

3. Arrangement for imaging surface structures according to claim 2, wherein an iteration algorithm (17) for a clear determination of characteristic digital patterns (13, 14) in each of the recorded image sections (10, 12) is provided in the matching unit (16).

4. Arrangement for imaging surface structures according to claim 3, wherein the iteration algorithm (17) is activated whenever a reproducible digital pattern (13, 14) is present in the matching unit (16) at least once, for each of the image sections (10, 12) that are part of the overall image.

5. Arrangement for imaging surface structures according to claim 3, wherein the iteration algorithm (17) allows a change in the data content of a digital pattern (13, 14) of an image section (10, 12) and, in the end result of an iteration step, a check for clear verifiability of a corresponding change in a digital pattern (13, 14) in at least one further image section (10, 12).

6. Arrangement for imaging surface structures according to claim 1, wherein a structure recording unit (18) that serves to record a structure change gradient of a digital pattern (13, 14) is implemented in the matching unit (16).

7. Arrangement for imaging surface structures according to claim 1, wherein the object to be imaged has a supplemental structure having a position determined relative to the object surface.

8. Arrangement for imaging surface structures according to claim 7, wherein in that an optical pattern is produced on the surface of the object to be imaged, by means of light projection.

9. Arrangement for imaging surface structures according to claim 7, wherein the material for the production of the object contains admixtures that are an integral part of the surface of the object, in the end result of the production process.

10. Arrangement for imaging surface structures according to claim 1, wherein the arrangement has an object carrier (1) made of glass or otherwise optically transparent material for the object to be imaged.

11. Arrangement for imaging surface structures according to claim 10, wherein the object carrier (1) is an integral part of a flatbed scanner (2).

12. Arrangement for imaging surface structures according to claim 10, wherein a positioning device (20) for positioning the object relative to the object carrier (1) is provided, and can be controlled in such a manner that the object is situated in an orientation that is optimized for the scanning procedure, in the end result of the positioning.

13. Arrangement for imaging surface structures according to claim 1, wherein the object to be imaged is an object for dental medicine use.

14. Arrangement for imaging surface structures according to claim 13, wherein it is used for recording, reproducing, documenting, archiving and/or analysis of jaw (21) or tooth models (3), of jaw or tooth impressions, of bite registrations, of bite or jaw relation registrations, and/or of preparations of the teeth.

15. Arrangement for imaging surface structures of three-dimensional, multi-part objects, having a device for optically recording the surface of at least two partial objects and having a digitalization unit that serves for digital storage of the optical data about the surface structure of the at least two partial objects, wherein the arrangement has a correlation device (24, 25), by way of which or with which at least two partial objects (22, 23) are connected in a defined positional relationship that can be pre-selected, that the correlation device (24, 25) is configured for a change in the relative position of the partial objects (22, 23) relative to one another that is bound to the correlation device (24, 25), and that at least one of the partial objects (22), bound to the correlation device (24, 25), can be moved from a functionally determined position into a different imaging position (A), suitable for optical recording together with at least one other partial object (23), in which optical recording of the partial objects (22, 23) and of the correlation device (24, 25) that connects the partial objects (22, 23) takes place, and that the arrangement has an allocation unit (27) in which the data obtained in the imaging position (A) and stored in the memory of the digitalization unit (7) relating to the surface structure of the partial objects (22, 23) are linked with data recorded in a reference module (28) concerning the change in position of at least one partial object (22) from the reference position (R) into the imaging position (A), so that the reference position (R) of the partial objects (22, 23) relative to one another can be reconstructed by means of calculations, including the data concerning the surface structure of the partial objects (22, 23).

16. Arrangement for imaging surface structures according to claim 15, wherein at least one partial object (22, 23) in the imaging position (A) is recorded from different observation directions, that the data sets in question are stored in the memory of the digitalization unit (7), and that the arrangement has an image processing unit (19) in which a three-dimensional overall image is produced from the data sets.

17. Arrangement for imaging surface structures according to claim 16, wherein the arrangement has a selection circuit (9) for selecting a first image section (10) of a partial object (22, 23), the optical data of which result from a first observation direction and are digitally recorded, and a subsequent image module (11) in which optical data of at least one other image section (12) of this partial object (22, 23), proceeding from a changed observation direction, are digitally recorded, and that a matching unit (16) is provided, in which matching of the digital patterns (13, 14) contained in the first (10) and in the at least one other image section (12) takes place with regard to characteristic digital patterns that agree, to a great extent, and in which matching data are generated as a function of the degree of agreement of the digital patterns (13, 14), which data are available to the image processing unit (19) for determining the spatially related parameters and for aggregating the image sections (10, 12) to produce a three-dimensional overall image of the partial object (22, 23).

18. Arrangement for imaging surface structures according to claim 15, wherein the correlation device (24) is inserted into the partial objects (22, 23) that are situated in the reference position (R).

19. Arrangement for imaging surface structures according to claim 18, wherein the correlation device is configured as an axle (24) about which the partial objects (22, 23) are disposed so as to pivot.

20. Arrangement for imaging surface structures according to claim 15, wherein the correlation device (25) and the partial objects (22, 23) are rigidly connected by way of connection regions (26), and the correlation device has a base (25) that can pivot and/or rotate.

21. Arrangement for imaging surface structures according to claim 20, wherein the base of the correlation device that can pivot and/or rotate is configured as a ball joint (25).

22. Arrangement for imaging surface structures according to claim 15, wherein a flatbed scanner (2) or laser scanner is used as the device for optically recording the surface of at least two partial objects.

23. Arrangement for imaging surface structures according to claim 15, wherein the partial objects (22, 23) to be imaged are an object of a dental medicine use.

24. Arrangement for imaging surface structures according to claim 22, wherein the relative position of the upper jaw and the lower jaw relative to one another is recorded as the reference position (R).

25. Arrangement for imaging surface structures according to claim 22, wherein it is used for recording, reproducing, documenting, archiving and/or analysis of jaw (21, 22, 23) or tooth models (3), of jaw or tooth impressions, of bite registrations, of bite or jaw relation registrations, and/or of preparations of the teeth.

* * * * *